Sept. 6, 1966  H. W. DELLETT ETAL  3,271,505
CABLE SPLICE CASE

Filed Sept. 9, 1963  3 Sheets-Sheet 1

INVENTORS
HAROLD W. DELLETT
WOODFORD J. CRUMP
BY
Lyon & Lyon
ATTORNEYS

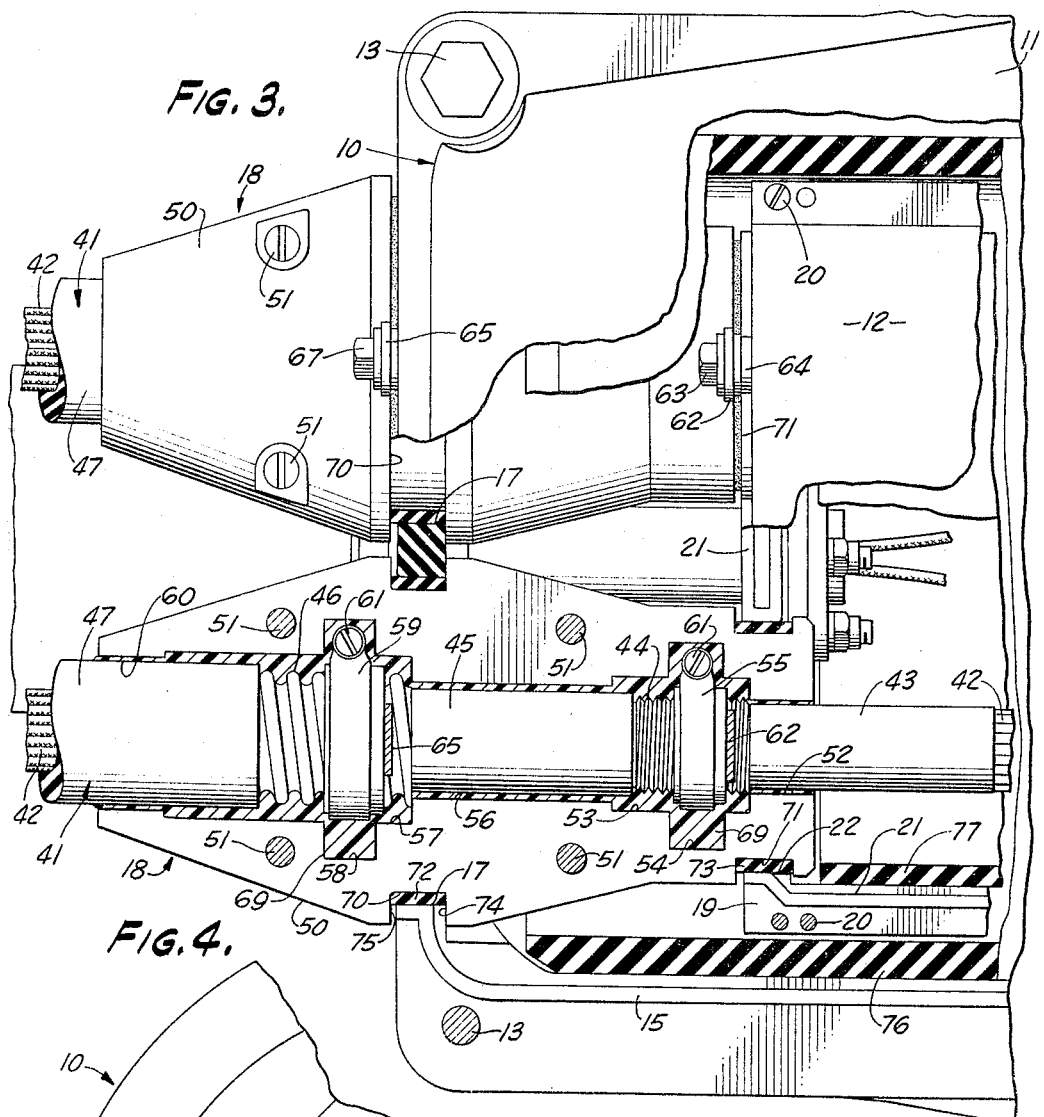
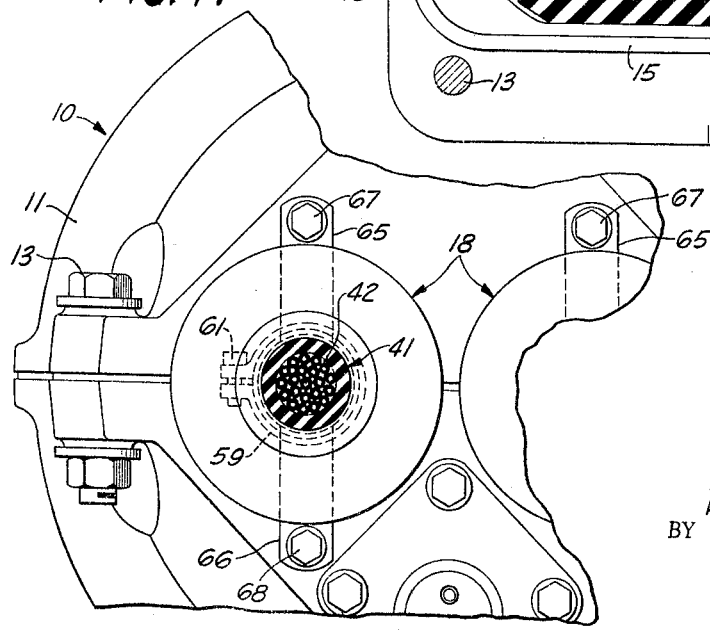

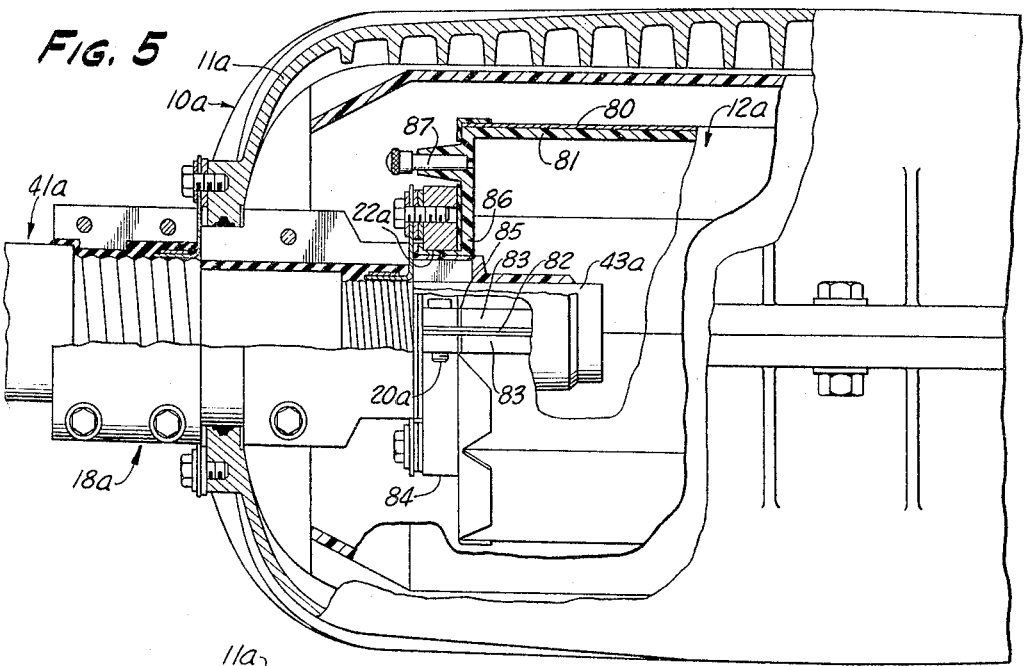
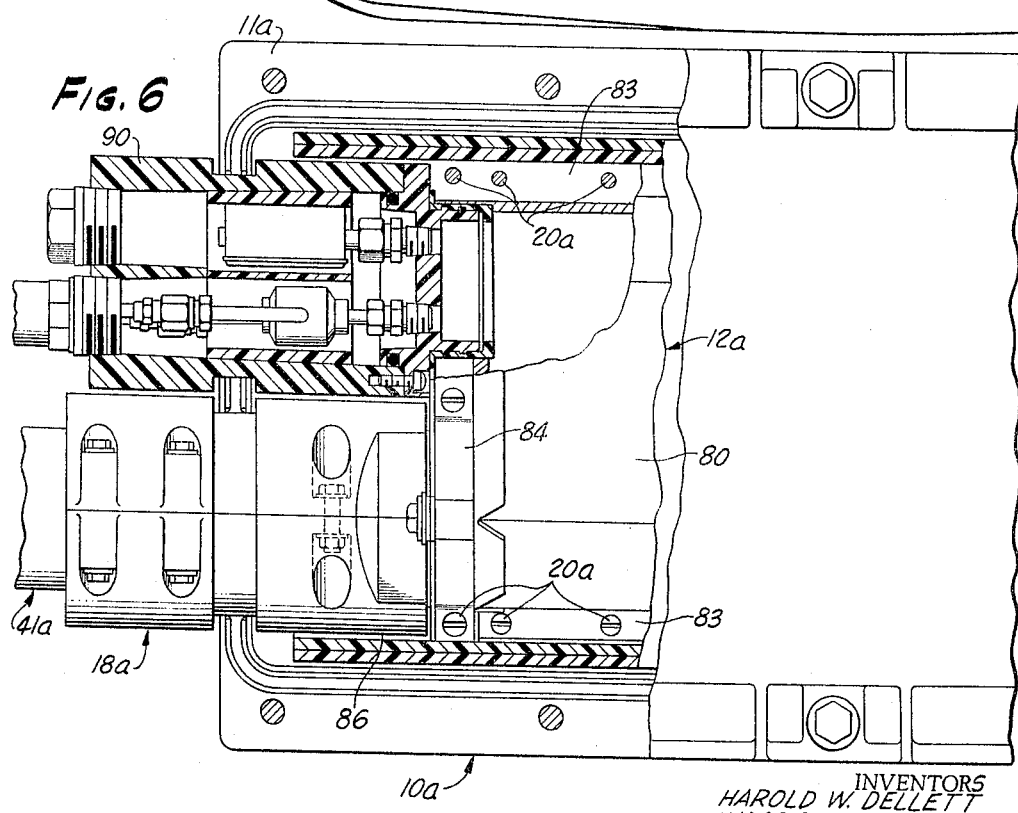

United States Patent Office 3,271,505
Patented Sept. 6, 1966

3,271,505
CABLE SPLICE CASE
Harold W. Dellett, Los Angeles, and Woodford J. Crump, South Gate, Calif., assignors to A.T.I. Industries, Inc., Los Angeles, Calif., a corporation of California
Filed Sept. 9, 1963, Ser. No. 307,537
11 Claims. (Cl. 174—21)

This invention relates to a splice case for accomplishing the splicing of two or more multiple conductor electrical cables and, in particular, is directed to such a splice case for connecting cables that are continually internally pressurized with air and adapted to be buried under ground.

There has become an increasing use of multiple conductor electrical cables that are provided with encircling metallic shielding and armor for permitting burial of the cable in the ground without further encasement or protection. This type of cable is often referred to as "hardened direct burial cable" and is often used in the communications systems of missile ground facilities. The entire length of the cable is internally pressurized with air for various purposes such as facilitating the ready detection of breaks or punctures in the cable. Often it is necessary to use more than one length of cable due to the fact that the distance between the two terminal points of the cable exceeds the available or practical length of continuous cable. In such situations, it is necessary to splice the ends of two cables together in a splice case which also must be capable of being buried without being adversely affected. Moreover, there are situations where it is desirable to connect the electrical conductors of one cable to the electrical conductors of two or more other cables that are leading to different destinations.

In each of these situations, it is necessary that the cable splice case be capable of retaining the internal air pressures of the cables and actually transmitting this air pressure from one cable to the others. Further, such a cable splice case must be capable of withstanding various externally applied loads and conditions which may be encountered after the cable and case are buried. For example, the mechanical connection between the cable and the splice case must be capable of withstanding tremendous tension loads applied to the cable, as might be caused by shifting earth, without affecting the electrical connections within the splice case. Moreover, there must be an electrical connection among the metallic armors of all of the cables connected through that splice case and a like but separate electrical connection among the metallic shields of all of such cables.

While various types of cable splice cases have been developed for accomplishing these purposes, there are certain features of these previously conventional splice cases which are at least objectionable, if not entirely unsatisfactory. For example, it has been conventional to provide cylindrical inner and outer housings which must be slipped on one cable prior to splicing the electrical conductors and then the housings are slipped back over the spliced conductors and connected to the cables. With this arrangement, it is impossible to subsequently check or repair any of the electrical splices without completely disconnecting the housings from the cables. Moreover, the mechanical connection between the housings and the cables are not entirely satisfactory in that it has been conventional to merely grip one or two layers of the multiple layers of material enclosing the multiple conductors.

Accordingly, it is a principal object of this invention to provide a novel form of splice case for connecting multiple conductor pressurized electrical cables which is adapted to be buried under ground and withstand the externally and internally applied pressures and forces.

A further object of this invention is to provide a novel form of cable splice case which is longitudinally split for permitting access to the spliced electrical conductors while the cables remain attached to the splice case.

Another object of this invention is to provide a novel form of cable splice case having novel means for securing the various layers of insulation, armor and shielding of the cable to the splice case whereby any tension load applied to the cable is transmitted by each of such various layers to the cable splice case.

A still further object of this invention is to provide a cable splice case having internal and external housings longitudinally split for lateral separation as desired without detachment of the cables from the housings and wherein both of said housings are pressure tight.

Still another object is to provide a novel form of longitudinally split cable splice case having internal and external housings wherein dielectric means secured to each cable pass through apertures in the walls of both the internal and external housings and yet externally applied forces on the cable are transmitted by the dielectric means only to the external housing. A further and more specific object is to provide such a cable splice case wherein means electrically connect the external housing to the metallic armor of the cable and means electrically connect the internal housing to the metallic shield of the cable.

Another object of this invention is to provide a novel form of connecting collar for securing to a multiple layer cable wherein each of the layers are secured to the connecting collar by a dielectric adhesive filling the collar for transmitting tension loads from the collar to all the layers of the cable.

Other and more detailed objects and advantages of this invention will appear from the following description and the accompanying drawings.

In the drawings:

FIGURE 3 is a fragmentary sectional plan view taken substantially on the line 3—3, as shown in FIGURE 2.

FIGURE 4 is an elevational view taken substantially on the line 4—4 as shown in FIGURE 1.

FIGURE 5 is a fragmentary sectional elevation of a modified form of the cable splice case of this invention.

FIGURE 6 is a fragmentary sectional plan view of the modified form of cable splice case illustrated in FIGURE 5.

Figure 1:
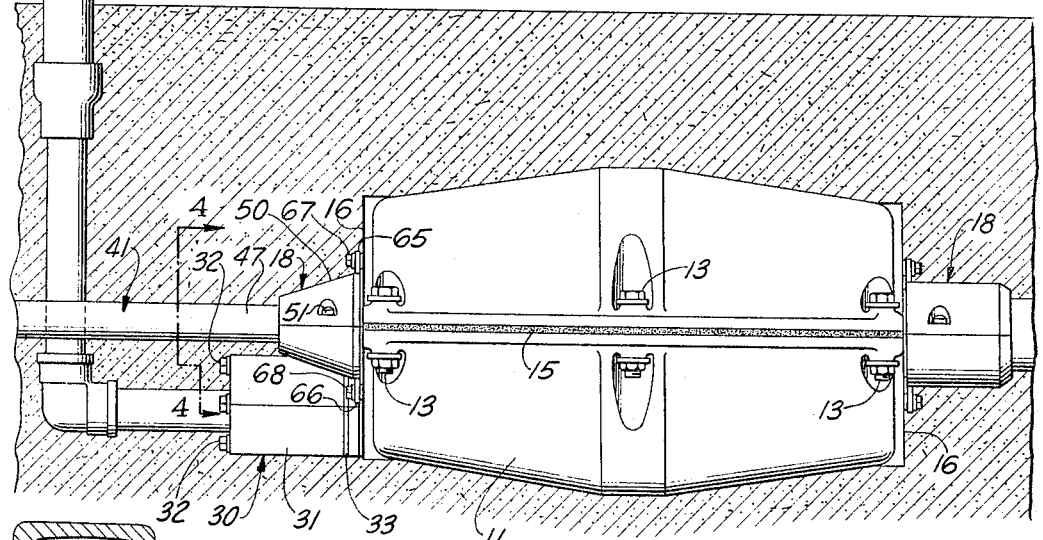
FIGURE 1 is an elevation view illustrating an embodiment of the cable splice case of this invention as normally installed in an underground buried position.

Referring more particularly to the embodiment of FIGURES 1-4, the cable splice case generally designated 10 of this invention is adapted for splicing one cable to one other cable, one cable to two other cables, or two cables to two cables. However, it is to be understood and will readily appear to those skilled in the art, that the cable splice case may readily be adapted to accommodate additional cables by merely adding means for accommodating such additional cables in the same fashion described for the cables illustrated.

The cable splice case 10 includes a generally cylindrical external housing 11 and a generally cylindrical internal housing 12. The external housing 11 is comprised of two mating halves of a generally semi-cylindrical shape which are removably secured together by any convenient means such as the six nut and bolt fasteners 13 as shown. The mating surfaces 14 of the two halves of housing 11 are provided with a seal therebetween such as the round rubber seal 15 as shown in FIGURE 3, although it is to be understood that any convenient type of gasket or seal may be used between the surfaces 14 of the two halves. The longitudinal ends 16 of the housing 11 are closed except for the large apertures 17 provided therein for receiving the cable fastening devices, generally designated 18, and hereinafter described in detail. The apertures 17 are formed between the two halves of housing 11 with part of the aperture formed in each half and, as shown in the drawings, it is preferred that apertures 17 be circular with their centers lying between the planes of the mating surfaces 14 of the two halves of housing 11. By this arrangement it may be seen that, since the cable fastening devices 18 are positioned in the apertures 17, one half of the housing 11 may be removed from the other half by releasing fasteners 13 without removing the cable fastening devices 18 from the remaining half of the housing.

Similarly the internal housing 12 is comprised of two generally semi-cylindrically halves joined together along their mating surfaces 19 by any convenient means such as a plurality of screw fasteners 20. Sealing means are provided between the mating surfaces 19 in order to accomplish a pressure tight seal between the halves and these sealing means may be of any convenient type such as a round rubber gasket 21 as shown. The longitudinal ends of internal housing 12 are closed except for apertures 22 to accommodate the cable fastening devices 18. There are an equal number of apertures 17 and apertures 22 provided in the housing 11 and 12 respectively, and this number is also equal to the number of cable fastening devices 18. For example, in the illustrated embodiment of cable splice case 10, there are four apertures 17, four apertures 22 and four cable fastening devices 18. Each one of the apertures 22 is positioned adjacent an aperture 17 although spaced therefrom, as shown. It is preferred that apertures 17 and 22 be axially aligned so that the cable fastening devices 18 may be symmetrically shaped. Apertures 22 are similar to apertures 17 in that each is partly formed by each half of housing 12. As with apertures 17, it is preferred that each aperture 22 be circular and have its center lying between the planes of mating surfaces 19. Thus it may also be seen that with one half of housing 11 removed it is possible to remove one half of internal housing 12 by releasing fasteners 20 without disengaging the cable fastening devices 18 from the remaining half of the housing 11 or the remaining half of internal housing 12.

An apparatus, generally designated 30, of relatively conventional design as will appear to those skilled in the art, is provided for accomplishing various well known functions such as pressurizing the internal housing 12, checking that internal pressure is being maintained, etc., and this apparatus 30 forms no part of the present invention. The apparatus 30 is shown in the drawings merely to illustrate how this conventionally used apparatus is used with the cable splice case of this invention. The apparatus 30 has a housing 31 mounted to one longitudinal end 16 of the lower half of housing 11 by means of bolts 32 with a gasket 33 to accomplish sealing relationship with the housing. A riser pipe 34 connects from housing 31 to above ground level as is conventional. An extension 35 of housing 31 extends into the internal housing 12 and is sealably mounted with respect thereto by a clamp device 36 collapsing a gasket 37 around the extension 35. Clamp device 36 is mounted to the inside of housing 12. By means of the tubes 38 extending within riser pipe 34 down to the various devices within housing 31, it is possible to check various conditions within the cable splice case from above ground in a manner well known to those skilled in the art. It is to be noted that apparatus 30 is mounted in the lower halves of both the internal housing 12 and the external housing 11 and therefore does not affect the removal of the upper halves of these housings as heretofore described. Further, the extension portion 35 of housing 31 is comprised of an insulating material and therefore does not form an electrical connection between the external housing 11 and the internal housing 12.

Figure 2:
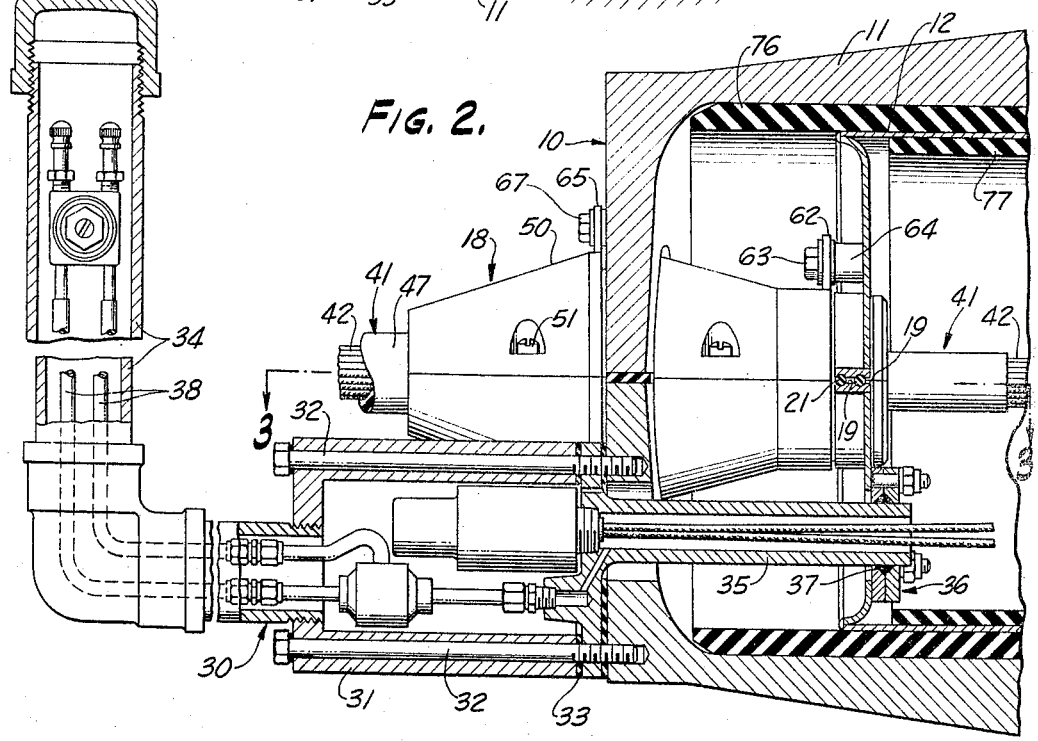
FIGURE 2 is a fragmentary sectional elevation through the center of the cable splice case of this invention.

The cable fastening device 18 serves the functions of securing the multiple conductor cable 41 to the splice case 10 and presenting the individual insulated conductors 42 to the inside of internal housing 12 so that these conductors may be electrically connected to the conductors of other multiple conductor cables similarly secured to the splice case by other cable fastening devices 18. Although a particular size and configuration of cable fastening device 18 is shown in FIGURES 2, 3 and 4, it is to be noted and will readily appear to those skilled in the art, that by merely varying the size of the internal bores of the device 18 and possibly the external shape, the cable fastening device 18 can be adapted to accommodate a wide range of sizes of electrical cables such as the much larger cable shown in the right hand side of FIGURE 1. Further, although a cable fastening device 18 will be described which is particularly adapted to use with a particular type of multiple conductor cable 41, it will be apparent and is to be understood that when using electrical cables having somewhat different constructions the cable fastening device 18 need merely be modified to accommodate such constructions. The cable 41, as shown in detail in FIGURE 3, is of typical construction for this type of cable as is available, for example, from Anaconda Wire & Cable Co., Hastings on Hudson, New York. In FIGURE 3, the cable 41 is shown in a progressively stripped-down condition to expose and illustrate the various layers of a typical cable. The conductors 42 are surrounded by an insulating jacket 43; which is in turn surrounded by a mild steel shield 44; which is in turn surrounded by an insulating separator jacket 45; which is in turn surrounded by a metallic, such as copper, armor 46; and, which is in turn surrounded by an insulating outer jacket 47.

The cable fastening device 18 is comprised of an elongated collar 50 of dielectric material formed of two half collars joined by any convenient means such as machine screws 51 passing through one half collar and threadedly connected to the other half collar. One end of collar 50 has a central bore 52 of a size to loosely fit the jacket 43 of the cable. Longitudinally next to bore 52 is provided an enlarged bore 53 adapted to be adjacent the shield 44 of the cable with a considerable annular space between the shield and the bore. Bore 53 has an enlarged portion 54 of a size sufficient to accommodate clamp 55, the purpose of which will hereinafter be described. Longitudinally adjacent bore 53 is provided a bore 56 of a size to loosely fit the jacket 45 of the cable. Longitudinally next to bore 56 the collar 50 is provided with an enlarged bore 57 adapted to be adjacent the armor 46 but providing a substantial annular space between the bore and the armor. Enlarged bore 57 is provided with a further enlarged portion 58 for accommodating clamp 59. Longitudinally next to enlarged bore 57 is provided a bore 60 extending to the remaining end of collar 50 and adapted to loosely fit the outer jacket 47 of the cable.

The clamps 55 and 59 may be of any convenient type such as a split ring having a threaded fastener 61 which may be actuated to tighten the clamp 55 or 59 onto the shield 44 or armor 46 respectively. The clamp 55 is provided with a radially extending strap 62 which extends upwardly through a provided aperture in the upper half of elongated collar 50. The upper end of strap 62 is provided with a hole and a bolt 63 secures strap 62 to a threaded bushing 64 mounted on the end wall of the internal housing 12. Clamp 59 is provided with a pair of radially extending straps 65 and 66 which extend upwardly and downwardly, respectively, through apertures provided in the collar 50. A hole is provided in the end of each of the straps 65 and 66 and a bolt 67 and 68, respectively, passes through such hole and is threadedly connected to the end 16 of housing 11 to thereby secure the straps 65 and 66 to housing 11.

When assembling the cable fastening device 18 to the cable 41, the cable 41 is appropriately stripped as shown, and the clamps 55 and 59 are secured to the shield 44 and armor 46 respectively. The clamps are tightened an amount sufficient to grip the shield or armor without crushing the cable. The bored portions of the two half collars 50 are then partially filled with any convenient dielectric adhesive or other dielectric material 69 which is formable and will harden to secure the various layers of the cable 41 to the collar 50. The two half collars of collar 50 are then secured together around the cable 41 by means of machine screws 51. It may be seen that this adhesive material 69 will completely surround each individual exposed layer of the cable 41 and secure that layer to the adjacent bore of the collar 50 thereby firmly mounting the cable 41 in the cable fastening device 18. Although many adhesive materials may be used it has been found that room temperature curing epoxy resins of the types known as "Epoxy—EC 2086" or "EC 2216—B/A" manufactured by Minnesota Mining and Manufacturing Co. have been highly satisfactory. In addition to performing other functions, it may be seen that the clamps 55 and 59 aid in resisting the withdrawal of cable 41 from the fastening device 18 due to extreme tensioning of cable 41 since these clamps are mechanically gripping the cable and are in turn bonded to the collar 50 by virtue of the surrounding adhesive material 69. Since the adhesive material 69 completely fills the spaces between the layers of the cable 41 and the bores of the collar 50 adjacent such layers, it may be seen that a wide range of sizes and configurations of cable will readily fit a single size collar of a given shape. Thus, while heretofore conventional cable clamping devices needed to be perfectly sized, including a plurality of sizes to accommodate the normal variances in dimensions of a given nominal sized cable, thereby requiring as many as 140 different sized devices for the conventional cable sizes, it has been found that about 9 sizes of collar 50 will adequately accommodate the same range of cable sizes.

With the cable 41 thus mounted, the cable fastening device 18 is ready to be mounted in the housings of the cable splice case 10. A pair of external annular grooves 70 and 71 are provided in spaced locations on the collar 50. A resilient sealing ring 72 is adapted to fit groove 70 and establish a pressure tight seal between collar 50 and aperture 17 in the external housing 11. Groove 71 is longitudinally spaced from groove 70 and is provided with a resilient sealing ring 73 which is adapted to accomplish a pressure tight seal between collar 50 and aperture 22 of the internal housing 12. With the cable fastening device 18 secured to cable 41 as heretofore described, the mounting of the cable and cable fastening device in the housings of the splice case 10 is accomplished by merely removing the upper halves of both the internal and external housings 11 and 12 respectively, positioning the cable fastening device 18 in the appropriate apertures 17 and 22, as heretofore described, and reinstalling the upper halves of the internal and external housings. The bolts 63, 67 and 68 are installed for securing the straps 62, 65 and 66 to the respective housings as is convenient during installation.

It is to be noted that groove 70 is provided with outwardly extending internal and external shoulders 74 and 75 respectively, separated by a distance slightly greater than the wall thickness of the end 16 of the housing 11. Thus, fastening device 18 is permitted to move a very small distance longitudinally with respect to housing 11. Groove 71 may also have outwardly extending shoulders similar to shoulders 74 and 75 but the shoulders of groove 71 are so spaced and also spaced with respect to shoulders 74 and 75 such that they do not engage the end wall of the inner housing 12 upon this longitudinal limited shifting of fastening device 18. Thus, when a tension is applied to the cable 41 external of the splice case 10, the shoulder 74 of fastening device 18 engages the inside of the longitudinal end 16 of external housing 11 and this tension force is applied directly to the external housing with no tension force being applied to the internal housing 12.

When it is desired to connect a fewer number of cables 41 to the splice case 10 than the number of apertures 17 that have been provided for accommodating cables, a plug (not shown) is merely installed in the housings 11 and 12 in the same manner as heretofore described for the installation of the cable fastening device 18. Such a plug may have a configuration identical to the fastening device 18 except that the internal bores are omitted and the plug may be solid instead of comprised of half collars. The plug still is provided with grooves or similar external surfaces like grooves 70 and 71 and sealing rings 72 and 73 will be used for accomplishing the seal between the plug and the apertures 17 and 22, respectively.

In order to provide electrical insulation between the external housing 11 and the internal housing 12, a cylinder of insulating material 76 is provided and encircles the internal housing 12. This cylinder of insulating material may also be longitudinally split similar to housings 11 and 12 to permit access to the internal housing 12 after removal of one-half of the external housing 11. A cylinder of insulating material 77 may also be provided on the inside of internal housing 12 for insulating the electrical conductors 42 of the cables from the internal housing. Similarly, cylinder 77 may be longitudinally split for access to the conductors 42. Cylinders 76 and 77 may actually be in the form of insulated linings of the halves of housings 11 and 12 respectively.

It is to be noted that the armors 46 of each of the cables 41 attached to the splice case 10 are electrically connected to the external housing 11 by means of the straps 65 and 66 and bolts 67 and 68, and since housing 11 is of an electrically conductive material, the armors of each of the cables are electrically connected. Similarly, since straps 62 electrically connect each of the shields 44 to the electrically conductive internal housing 12, the shields 44 of all of the cables are electrically connected.

Referring more particularly to FIGURES 5 and 6 a modified form of cable splice case, generally designated 10a, of this invention is illustrated which is substantially similar to splice case 10. Splice case 10a is provided with external and internal housings 11a and 12a, respectively, that are longitudinally split into halves similar to housings 11 and 12. As with external housing 11, means are provided with external housing 11a for releasably securing and sealing the two halves together. Internal housing 12a is comprised of a thin wall casing 80 formed in two longitudinally split halves with bladder 81 positioned inside casing 80. Bladder 81 is also comprised of two longitudinally split halves and is preferably of a flexible dielectric material such as, but not limited to, rubber. The bladder 81 is preformed to fit the interior of casing 80 and is provided with flange portions 82 for fitting between the mating flanges 83 of the halves of casing 80 to form a seal therebetween when housing 12a is assembled by securing fasteners 20a. Flange members 84 are provided on each longitudinal end of each half of casing 80 for forming the apertures 22a therein similar to heretofore described apertures 22. A portion of bladder 81 extends through such aperture 22a for perfecting the seal between the cable fastening devices 18a and the housing 12a. A generally cylindrical boot 85 of flexible sealing material tightly surrounds the jacket 43a of the cable 41a and is preformed to fit the cylindrical outer surface 86 of the cable fastening device 18a. A portion of both the boot 85 and bladder 81 are fitted between the aperture 22a formed by flange members 84 and the surface 86 of device 18a and also cable 41a for forming an air-tight seal. A valve 87 is provided in bladder 81 and extends outwardly of casing 80 to permit pressurizing of the bladder after assembly of housing 12a.

It is to be noted that cable fastening device 18a is substantially the same and functions in the same manner as heretofore described device 18, except that cylindrical surface 86 has been substituted for groove 71 provided in device 18.

FIGURE 6 further illustrates a modification which also may be employed with cable splice case 10. The previously described apparatus 30 of conventional design and function may be appropriately modified and fitted to a housing 90 rather than housing 31. The exterior of housing 90 is substantially the same as the exterior shape of a cable fastening device 18 or 18a and therefore may be mounted in the splice case 10 or 10a in the same manner as is a cable.

Thus it may be seen that a cable splice case has been provided that is capable of connecting this type of multiple conductor cable which is internally pressurized and this internal pressure is transmitted from one cable to another through the sealed internal housing 12. Further, an arrangement is provided by this invention for securely gripping the cable by each of the many layers of the cable and in turn securing the cable to the splice case in a manner capable of withstanding extreme externally applied conditions of cable tensioning. Moreover, while accomplishing these many important requirements, a cable splice case is provided by this invention which is capable of being dismantled for inspection, maintenance or modification of the electrical connection of the multiple conductors without detaching the cables from the splice case.

Having fully described the invention, it is to be understood that the invention is not to be limited to the details herein set forth or to the details illustrated in the drawings, but is of the scope of the appended claims.

What is claimed is:

1. In a cable splice case for connecting at least one electrical cable to at least one other electrical cable where such electrical cables are of the type that are internally pressurized and have a bundle of insulated conductors therein, the combination of:

an internal housing comprised of a pair of mating halves, means for sealably connecting said mating halves, a plurality of apertures in said internal housing located between said mating halves with part of each aperture formed in one said half and the remainder of the aperture formed in the other half, an external housing comprised of a pair of mating halves and surrounding said internal housing, means for sealably connecting said mating halves of said external housing, a plurality of apertures in said external housing located between the said mating halves of said external housing with part of the aperture formed in one said half and the remainder of the aperture formed in the other half, an elongated collar for each electrical cable, each said collar comprised of a pair of mating halves loosely surrounding the associated electrical cable, each said collar positioned within one of said apertures in said internal housing and one of said apertures in said external housing, means for sealing each said collar with both of the said apertures that collar is positioned within, means for connecting the said halves of each collar, and an adhesive within each said collar securing the associated cable to that collar.

2. In a cable splice case connecting at least one electrical cable to at least one other electrical cable where such electrical cables are of the type that are internally pressurized and have a bundle of insulated conductors, the combination of:

an internal housing comprised of a pair of mating halves, means sealably connecting said mating halves, a plurality of apertures in said internal housing equal in number to the electrical cables connected by the splice case, each said aperture located between said mating halves with part of the aperture formed in one said half and the remainder of the aperture formed in the other half, an external housing comprised of a pair of mating halves and surrounding said internal housing, means sealably connecting said mating halves of said external housing, a plurality of apertures in said external housing equal in number to the apertures in said internal housing, each of said apertures in said external housing located adjacent a said aperture in said internal housing and between the said mating halves of said external housing with part of the aperture formed in one said half and the remainder of the aperture formed in the other half, an elongated collar for each electrical cable, each said collar comprised of a pair of mating halves loosely surrounding the associated electrical cable, each said collar positioned within one of said apertures in said internal housing and one of said apertures in said external housing, means sealing each said collar with both of the said apertures that collar is positioned within, means connecting the said halves of each collar, and an adhesive within each said collar securing the associated cable to that collar.

3. In a cable splice case connecting at least one electrical cable to at least one other electrical cable where such electrical cables are of the type that are internally pressurized and have a bundle of insulated conductors surrounded by a metallic shield which is in turn surrounded by and insulated from a metallic armor, the combination of:

an internal housing comprised of a pair of mating halves, means sealably connecting said mating halves, a plurality of apertures in said internal housing located between said mating halves with part of each aperture formed in one said half and the remainder of the aperture formed in the other half, an external housing comprised of a pair of mating halves and surrounding said internal housing, means sealably connecting said mating halves of said external housing, a plurality of apertures in said external housing located between the said mating halves of said external housing with part of the aperture formed in one said half and the remainder of the aperture formed in the other half, an elongated collar for each electrical cable, each said collar comprised of a pair of mating halves loosely surrounding the associated electrical cable, each said collar positioned within one of said apertures in said internal housing and one of said apertures in said external housing, means sealing each said collar with both of the said apertures that collar is positioned within, shoulder means on each said collar engaging the external housing to limit longitudinal movement of said collar, first clamp means connected to the metallic shield of each cable at a location within said collar, second clamp means for connecting to the metallic armor of each cable at a location within said collar, conductor means on each said clamp means extending outwardly of the associated collar, means connecting the said conductor means of each said first clamp to the internal housing, means connecting the said conductor means of each said second clamp means to the external housing, means connecting the said halves of each collar, and an adhesive within each said collar securing the associated cable and clamp means to that collar.

4. In a cable splice case connecting at least one electrical cable to at least one other electrical cable where such electrical cables are of the type that are internally pressurized and have a bundle of insulated conductors surrounded by a metallic shield which is in turn surrounded by and insulated from a metallic armor, the combination of:

an internal housing comprised of a pair of mating halves, means sealably connecting said mating halves, a plurality of apertures in said internal housing equal in number to the electrical cables connected by the splice case, each said aperture located between said mating halves with part of the aperture formed in one said half and the remainder of the aperture formed in the other half, an external housing comprised of a pair of mating halves and surrounding said internal housing, means sealably connecting said mating halves of said external housing, a plurality of apertures in said external housing equal in number to the apertures in said internal housing, each of said apertures in said external housing located adjacent a said aperture in said internal housing and between the said mating halves of said external housing with part of the aperture formed in one said half and the remainder of the aperture formed in the other half, an elongated collar for each electrical cable, each said collar comprised of a pair of mating halves loosely surrounding the associated electrical cable, means connecting said halves, each said collar having an external surface mating with a first said aperture in said internal housing and a second external surface spaced from the first said surface mating with the said aperture in said external housing adjacent said first aperture, means sealing between said apertures said external surfaces of the collar, shoulder means on each said collar engaging the external housing to limit longitudinal movement of the collar, first clamp means connected to the metallic armor of each cable at a location within said collar, second clamp means connected to the metallic armor of each cable at a location within said collar, conductor means on each said clamp means extending outwardly of the associated collar, means connecting the said conductor means of each said first clamp to the internal housing, means connecting the said conductor means of each said second clamp means to the external housing, and an adhesive within each said collar securing the associated cable and clamp means to that collar.

5. In a cable splice case connecting at least one electrical cable to at least one other electrical cable where such electrical cables are of the type that are internally pressurized and have a bundle of insulated conductors surrounded by a metallic shield which is in turn surrounded by and insulated from a metallic armor, the combination of:

an internal housing, an external housing surrounding said internal housing, a plurality of apertures in said internal housing equal in number to the electrical cables connected by the splice case, a like plurality of apertures in said external housing, an elongated collar for each electrical cable, each said collar comprised of a pair of mating halves loosely surrounding the associated electrical cable, means connecting said halves, each said collar having an external surface mating with a first said aperture in said internal housing and a second external surface spaced from the first said surface mating with the said aperture in said external housing adjacent said first aperture, means sealing between said apertures and said external surfaces of the collar, shoulder means on each said collar engaging the external housing to limit longitudinal movement of the collar, first clamp means connected to the metallic shield of each cable at a location within said collar, second clamp means connected to the metallic armor of each cable at a location within said collar, conductor means on each said clamp means extending outwardly of the associated collar, means connecting the said conductor means of each said first clamp means to the internal housing, means connecting the said conductor means of each said second clamp means to the external housing, and an adhesive within each said collar securing the associated cable and clamp means to that collar.

6. In a cable splice case connecting at least one electrical cable to at least one other electrical cable where such electrical cables are of the type that are internally pressurized and have been longitudinally and progressively stripped to expose the various layers of the cable including a metallic shield layer, a metallic armor layer, and other layers, the combination of:

an internal housing, an external housing surrounding said internal housing, a plurality of apertures in said internal housing equal in number to the electrical cables connected by the splice case, a like plurality of apertures in said external housing, each of said apertures in said in external housing located adjacent a said aperture in said internal housing, an elongated collar for each electrical cable, each said collar comprised of a pair of mating halves surrounding the associated cable, means connecting said halves, each said collar having an external surface mating with a first said aperture in said internal housing and a second external surface spaced from the first said surface mating with the said aperture in said external housing adjacent said first aperture, means sealing between said apertures and said external surfaces of the collar, shoulder means on each said collar engaging the external housing to limit longitudinal movement of the collar, first clamp means connected to the metallic shield of each cable at a location within said collar, second clamp means for connecting to the metallic armor of each cable at a location within said collar, conductor means on each said clamp means extending outwardly of the associated collar, means connecting the said conductor means of each said first clamp to the internal housing, means connecting the said conductor means of each said second clamp means to the external housing; each said collar having an irregular internal bore comprised of enlarged portions surrounding the metallic shield and armor and accommodating said clamps with substantial annular space between said collar and the shield, armor and clamps, and said internal bore having portions closely surrounding the other exposed layers of the cable; and an epoxy resin substantially filling the said internal bore of each collar bonding the shield, armor, clamps and other exposed layers of the cable to said collar.

7. In a cable splice case connecting at least one electrical cable to at least one other electrical cable where such electrical cables are of the type that are internally pressurized and have been longitudinally and progressively stripped to expose the various layers of the cable including a metallic shield layer, a metallic armor layer, and other layers, the combination of:

an internal housing comprised of a pair of mating halves, means sealably connecting said mating halves, a plurality of apertures in said internal housing located between said mating halves with part of each aperture formed in one said half and the remainder of the aperture formed in the other half, an external housing comprised of a pair of mating halves and surrounding said internal housing, means sealably connecting said mating halves of said external housing, a plurality of apertures in said external housing located between the said mating halves of said external housing with part of the aperture formed in one said half and the remainder of the aperture formed in the other half, an elongated collar for each electrical cable, each said collar comprised of a pair of mating halves surrounding the associated cable, means connecting said halves, each said collar having an external surface mating with a first said aperture in said internal housing and a second external surface spaced from the first said surface mating with the said aperture in said external housing adjacent said first aperture, means sealing between said apertures and said external surfaces of the collar, shoulder means on each said collar engaging the external housing to limit longitudinal movement of the collar, first clamp means connected to the metallic shield of each cable at a location within said collar, second clamp means connected to the metallic armor of each cable at a location within said collar, conductor means on each said clamp means extending outwardly of the associated collar, means connecting the said conductor means of each said first clamp means to the internal housing, means connecting the said conductor means of each said second clamp means to the external housing, each said collar having an irregular internal bore comprised of enlarged portions surrounding the metallic shield and armor and accommodating said clamps with substantial annular space between said collar and the shield, armor and clamps, and said internal bore having portions closely surrounding the other exposed layers of the cable; and an epoxy resin substantially filling the said internal bore of each collar bonding the shield, armor, clamps and other exposed layers of the cable to said collar.

8. In a cable splice case connecting electrical cables of the type having multiple layers of insulating and protective materials surrounding a bundle of insulated conductors where the interior of such cable is to be pressurized, the combination of:

internal and external housings insulated from each other and having an aperture in each for each cable, a dielectric collar for each cable and having external means fitting a said aperture in each of said housings, the cable being progressively stripped of each layer to expose a portion of each layer, each collar having a plurality of longitudinally adjacent and aligned bores of preselected sizes loosely fitting each portion of exposed layer of the cable, and a dielectric adhesive material filling said collar between said bores and said exposed layers of the cable securing each said layer to the collar.

9. In a cable splice case connecting electrical cables of the type having multiple layers of insulating and protective materials surrounding a bundle of insulated conductors where the interior of such cable is to be pressurized, the combination of: internal and external housings insulated from each other and having an aperture in each for each cable, a dielectric collar on each cable and having external means fitting a said aperture in each of said housings, the cable being progressively stripped of each layer to expose a portion of each layer, the protective material layers of each cable comprised of metallic shielding, a clamp secured to each said protective material layer and having an electrically conductive strap extending outwardly, each collar having a plurality of longitudinally adjacent and aligned bores of preselected sizes loosely fitting each portion of exposed layer of the cable, apertures in said collar passing said straps through the collar, means securing each strap to one of said housings, and a hard setting epoxy resin filling said collar between said bores and said exposed layers of the cable bonding each said exposed layer to the collar.

10. In a cable splice case for connecting at least one electrical cable to at least one other electrical cable where such electrical cables are of the type that are internally pressurized and have a bundle of insulated conductors the combination of: an internal housing comprised of a pair of mating halves, means sealably connecting said mating halves, a plurality of apertures in said internal housing located between said mating halves with part of each aperture formed in one said half and the remainder of the aperture formed in the other half, an external housing comprised of a pair of mating halves and surrounding said internal housing, means sealably connecting said mating halves of said external housing, a plurality of apertures in said external housing located between the said mating halves of said external housing with part of the aperture formed in one said half and the remainder of the aperture formed in the other half, an elongated collar for each electrical cable, each said collar comprised of a pair of mating halves for loosely surrounding an associated electrical cable, each said collar positioned within one of said apertures in said internal housing and one of said aperture in said external housing, means sealing each said collar with both of said apertures that collar is positioned within and means connecting the said halves of each collar.

11. In a cable splice case connecting at least one electrical cable to at least one other electrical cable where such electrical cables are of the type that are internally pressurized and have been longitudinaly and progressively stripped to expose the various layers of the cable including a metallic shield layer, a metallic armor layer, and other layers, the combination of: an internal housing comprised of a pair of mating halves, means sealably connecting said mating halves, a plurality of apertures in said internal housing located between said mating halves with part of each aperture formed in one said half and the remainder of the aperture formed in the other half, an external housing comprised of a pair of mating halves and surrounding said internal housing, means sealably connecting said mating halves of said external housing, a plurality of apertures in said external housing located between the said mating halves of said external housing with part of the aperture formed in one said half and the remainder of the aperture formed in the other half, an elongated collar for each electrical cable, each said collar comprised of a pair of mating halves for surrounding an associated cable, means connecting said halves, each said collar having an external surface mating with a first said aperture in said internal housing and a second external surface spaced from the first said surface mating with the said aperture in said external housing adjacent said first aperture, means sealing between said apertures and said external surfaces of the collar, shoulder means on each said collar engaging the external housing to limit longitudinal movement of the collar, first clamp means for connecting to the metallic shield of each cable at a location within said collar, clamp means for connecting to the metallic armor of each cable at a location within said collar, conductor means on each said clamp means extending outwardly of the associated collar, means connecting the said conductor means of each said first clamp to the internal housing, means connecting the said conductor means of each said second clamp to the external housing, each said collar having an irregular internal bore comprised of enlarged portions for surrounding the metallic shield and armor and accommodating said clamps with substantial annular space between said collar and the shield, armor and clamps, and said internal bore having portions for closely surrounding the other exposed layers of the cable.

References Cited by the Examiner

UNITED STATES PATENTS 2,930,835   3/1960   Bollmeier _____ 174—92 X
3,130,259   4/1964   Rischard et al. _____ 174—93

LEWIS H. MYERS, *Primary Examiner.*

DARRELL L. CLAY, ROBERT K. SCHAEFER,
*Examiners.*